No. 639,337.  
A. R. ANTHONY.  
COTTER PIN.  
(Application filed Mar. 9, 1898.)  
Patented Dec. 19, 1899.
(No Model.)
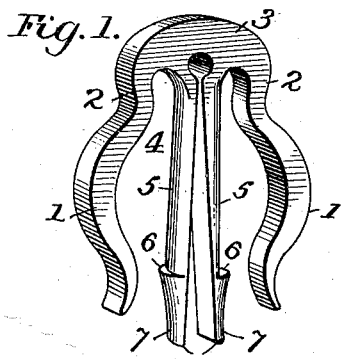
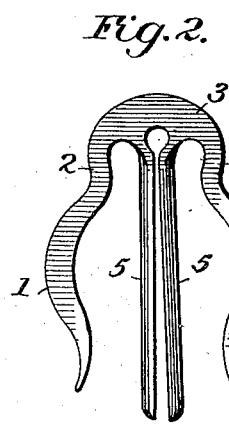
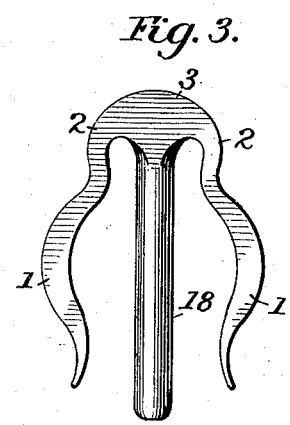
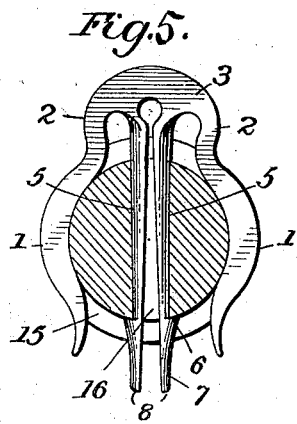
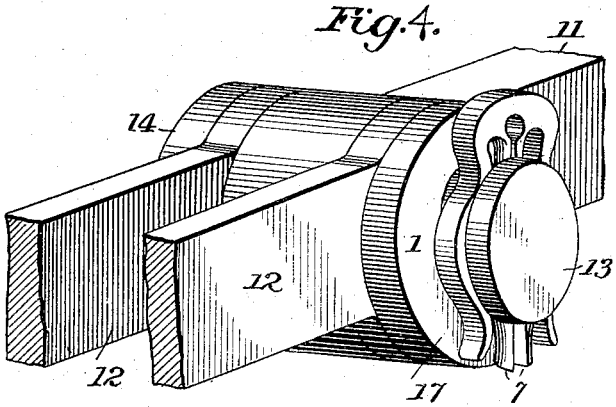
Witnesses  
J. G. Hinkel  
William E. Neff
Inventor  
A. R. Anthony  
By Watson & Watson  
Attorneys

UNITED STATES PATENT OFFICE.

ALFRED ROWAN ANTHONY, OF WILKES-BARRÉ, PENNSYLVANIA.

COTTER-PIN.

SPECIFICATION forming part of Letters Patent No. 639,337, dated December 19, 1899.

Application filed March 9, 1898. Serial No. 673,261. (No model.)

*To all whom it may concern:*

Be it known that I, ALFRED ROWAN ANTHONY, a citizen of the United States, residing at Wilkes-Barré, in the county of Luzerne and State of Pennsylvania, have invented certain new and useful Improvements in Cotter-Pins, of which the following is a specification.

My invention relates to improvements in devices for retaining removable heads or other fixtures on shafts. It is particularly designed for retaining links on the studs or pivot-pins of drive-chains, although it may of course be used for any analogous purpose.

In the accompanying drawings, which illustrate my improvements, Figures 1 to 3, inclusive, are perspective views of different forms of my improved retaining device. Fig. 4 is a similar view showing the application of the device to a drive-chain stud; and Fig. 5 is a cross-section through the stud shown in Fig. 4, taken directly in front of the retaining device.

As shown in Fig. 1 of the drawings, my improved device comprises a pair of opposing arc-shaped arms 1, each united by a reversely-curved portion 2 to the head 3 of a split pin 4, each member 5 of the divided shank of the split pin having near its lower extremity an outwardly-projecting barb or shoulder 6 and a pointed end 7, formed by tapering the outer face of the shank from the shoulder to the extremity 8. The device is formed from a single piece of spring metal. The arms 1 are wider than the curved connecting portions 2, so that they are comparatively rigid, while the parts 2 will yield when the arms are forced apart. The inner edges 9 of the arms are formed in the arc of a circle corresponding to the circumference of the part of the shaft or stud which they are designed to embrace. The two parts 5 of the shank are normally divergent toward the lower ends, so that they will have a tendency to spring apart when compressed. The line of separation between the two parts of the shank may extend into an eye 10 in the head of the pin.

Referring to Figs. 4 and 5, which show my device applied to a drive-chain, 11 and 12 indicate links of a chain which are pivoted on a stud 13. The stud is provided with a circular retaining-flange 14 at one end. Near the opposite end it is provided with an annular recess 15 and a perforation 16, extending diametrically through the stud in the plane of the recess. The retaining device is applied to the stud in the manner clearly indicated in the drawings, the split pin 4 extending through the perforation 16 and the arms 1 embracing the reduced part of the stud within the recess 15. When the pin has been passed through the perforation 16, the two parts of the shank spring apart and the shoulders 6 project beyond the walls of the perforation 16, so that the device cannot be removed except by first compressing the two parts of the shank and then pulling the device outward with sufficient force to overcome the tension of the spring-arms. The pointed ends of the two-part shank render its insertion into the perforation easy. The arms of the clip are preferably flat, and the portions projecting beyond the circumference of the stud form a flat bearing-surface, against which a washer 17 or the fitting to be retained may rest, the device thus serving as a combined cotter-pin and collar.

In some cases the barbs or shoulders 6 may be dispensed with, as shown in Fig. 2, the device retaining all the other features of Fig. 1. In this case the device will be held upon the stud by the spring-clip and the divergent members 5 of the split pin. In the form shown in Fig. 3 the central pin instead of being split is formed solid and without barbs or shoulders.

Having described my invention, what I claim, and desire to secure by Letters Patent, is—

1. The fastening comprising a split pin adapted to pass through a shaft and a pair of spring-arms made integral with said pin and arranged to encircle the shaft, substantially as described.

2. The combination with a split pin having normally-divergent barbed points, of a pair of spring-arms integral with said pin and adapted to encircle the shaft through which the pin passes, substantially as described.

3. The combination with a shaft having a diametrical perforation and an annular groove, of a pin adapted to enter said perforation and a pair of comparatively rigid arms adapted to fit in the annular groove on opposite sides of the pin, said arms being connected to the head of the pin by spring connections, substantially as described.

In testimony whereof I affix my signature in presence of two witnesses.

ALFRED ROWAN ANTHONY.

Witnesses:
 B. C. HAIGHT,
 W. L. PARSONS.